(12) United States Patent
Fan

(10) Patent No.: US 9,995,442 B2
(45) Date of Patent: Jun. 12, 2018

(54) MULTI-FUNCTION PORTABLE LIGHTING APPARATUS

(71) Applicant: Eagle Fan, Chu-Pei (TW)

(72) Inventor: Eagle Fan, Chu-Pei (TW)

( * ) Notice: Subject to any disclaimer, the term of this patent is extended or adjusted under 35 U.S.C. 154(b) by 216 days.

(21) Appl. No.: 15/161,276

(22) Filed: May 22, 2016

(65) Prior Publication Data

US 2017/0336056 A1 Nov. 23, 2017

(51) Int. Cl.
| | |
|---|---|
| *F21L 4/00* | (2006.01) |
| *F21V 33/00* | (2006.01) |
| *F21V 21/14* | (2006.01) |
| *G03B 15/05* | (2006.01) |
| *F21S 6/00* | (2006.01) |
| *F21L 4/04* | (2006.01) |
| *F21S 9/02* | (2006.01) |
| *F21V 21/06* | (2006.01) |

(52) U.S. Cl.
CPC .......... *F21L 4/005* (2013.01); *F21V 21/145* (2013.01); *F21V 33/008* (2013.01); *G03B 15/05* (2013.01); *F21L 4/045* (2013.01); *F21S 6/005* (2013.01); *F21S 9/02* (2013.01); *F21V 21/06* (2013.01)

(58) Field of Classification Search
CPC .. F21S 9/02; F21S 6/005; F21V 21/10; F21V 23/0442; F21V 33/0052; F21V 21/145; F21V 33/008; F21V 21/06; F21L 4/027; F21L 4/005; F21L 4/045; G03B 15/03; G03B 17/02; G03B 29/00; G03B 15/05
See application file for complete search history.

(56) References Cited

U.S. PATENT DOCUMENTS

| | | | | |
|---|---|---|---|---|
| 7,909,490 | B2 * | 3/2011 | Chou | F21V 21/26 362/188 |
| 8,142,045 | B2 * | 3/2012 | Peak | B60Q 7/00 362/183 |
| 2007/0098391 | A1 * | 5/2007 | Howard | F21L 4/027 396/155 |
| 2008/0302933 | A1 * | 12/2008 | Cardellini | F16B 2/10 248/231.31 |
| 2009/0141495 | A1 * | 6/2009 | Lin | F21V 21/22 362/253 |
| 2013/0094196 | A1 * | 4/2013 | Wessel | F21L 4/04 362/198 |

(Continued)

*Primary Examiner* — Thien T Mai
(74) *Attorney, Agent, or Firm* — Lin & Associates Intellectual Property, Inc.

(57) ABSTRACT

A multi-function portable lighting apparatus is provided, including a lighting device, a carrier unit and a support unit. The carrier unit has two ends, with one end disposed with lighting device and the other coupled with support unit. The support unit includes a battery set, supplying power to lighting device. The carrier unit includes a clamping assembly, and the clamping assembly has a clamping opening, with direction perpendicular to light projection axis of lighting device. The clamping assembly includes a clamping base, a clamping element and a rotation element. The rotation element matches the clamping element in a means of screw. When the rotation element rotates, the clamping element moves in clamping base linearly to open or close clamping opening. The apparatus can be used as a flashlight or clamping onto a smart phone to provide lighting when the ambient light is insufficient for photography.

5 Claims, 9 Drawing Sheets

(56) References Cited

U.S. PATENT DOCUMENTS

| | | | | |
|---|---|---|---|---|
| 2013/0271993 A1* | 10/2013 | Jan | ............................ | F21V 21/30 |
| | | | | 362/249.09 |
| 2014/0070674 A1* | 3/2014 | Chung | ..................... | H02N 99/00 |
| | | | | 310/75 B |
| 2014/0301066 A1* | 10/2014 | Inskeep | ....................... | F21S 9/02 |
| | | | | 362/183 |
| 2017/0314729 A1* | 11/2017 | Torbitt | ................... | F21V 33/008 |

\* cited by examiner

MULTI-FUNCTION PORTABLE LIGHTING APPARATUS

TECHNICAL FIELD

The technical field generally relates to a multi-function portable light apparatus, and in particular, to a flashlight that can be used to hold a smart phone and serve as an auxiliary lighting apparatus for photo-shooting.

BACKGROUND

The photo-shooting function is a popular function for smart phones. The high-end smart phones offer photography functions that can rival even professional cameras. However, when the ambient light insufficient, the photo quality often suffers greatly. An ideal scenario for many users is the use a lighting device as an additional light source to compensate the lack of light. However, photo-shooting becomes awkward and even frustrating when the user needs to hold the smart phone in one hand and the additional lighting device in the other.

The flashlight is a popular lighting device, and many additional functions are incorporated in the contemporary flashlight, such as, adjustable brightness, light color change, flashing or tinkering, and so on.

As the outdoor activities regain popularity in recent years, an apparatus that is able to provide additional light stand-alone or as auxiliary lighting source when photo-shooting with a smart phone to provide convenience is imperative for outdoor and/or photography enthusiasts.

SUMMARY

The primary object of the present invention is to provide a multi-function portable lighting apparatus. In addition to providing light, the apparatus is able to fasten a smart phone to enable easy photography in situations with insufficient ambient light.

To achieve the aforementioned object, the present invention provides a multi-function portable lighting apparatus of a long tubular shape, including a lighting device, a carrier unit and a support unit. The carrier unit has two ends. The lighting device is disposed at one end of the carrier unit and the support unit is coupled to the other end of the carrier unit. The support unit includes a battery set, which supplies power to the lighting device through an internal circuit. The body of the carrier unit is disposed with a clamping assembly, and the clamping assembly has a clamping opening, whose direction is perpendicular to the light projection axis of the lighting device. The clamping assembly includes a clamping base, a clamping element and a rotation element. The rotation element matches the clamping element in a means of screw. When the rotation element rotates, the clamping element moves in the clamping base in a linear manner to make the clamping opening open or close.

The carrier unit uses a coupling structure to engage with the support unit so that the angle between the support unit and the carrier unit is adjustable to change the light projection direction of the lighting device.

The support unit further includes a tripod set, disposed at the end of the support unit away from the carrier unit. As such, the tripod is used for the apparatus to stand on a ground or a flat surface. When the clamping assembly of the carrier unit holds a smart phone, the lighting device provides auxiliary lighting source to enable photo-shooting for insufficient ambient light.

The foregoing will become better understood from a careful reading of a detailed description provided herein below with appropriate reference to the accompanying drawings.

BRIEF DESCRIPTION OF THE DRAWINGS

The embodiments can be understood in more detail by reading the subsequent detailed description in conjunction with the examples and references made to the accompanying drawings, wherein.

DETAILED DESCRIPTION OF THE DISCLOSED EMBODIMENTS

Figure 1:
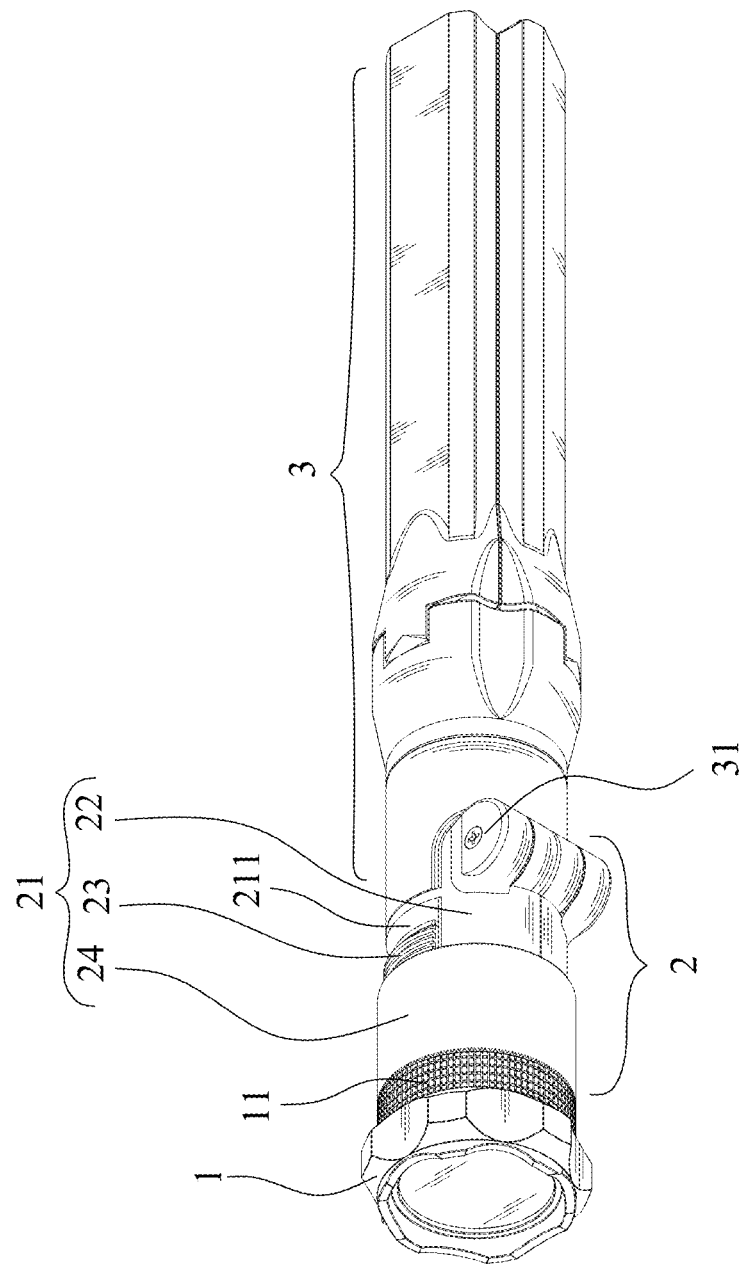
FIG. 1 shows a schematic view of the present invention.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
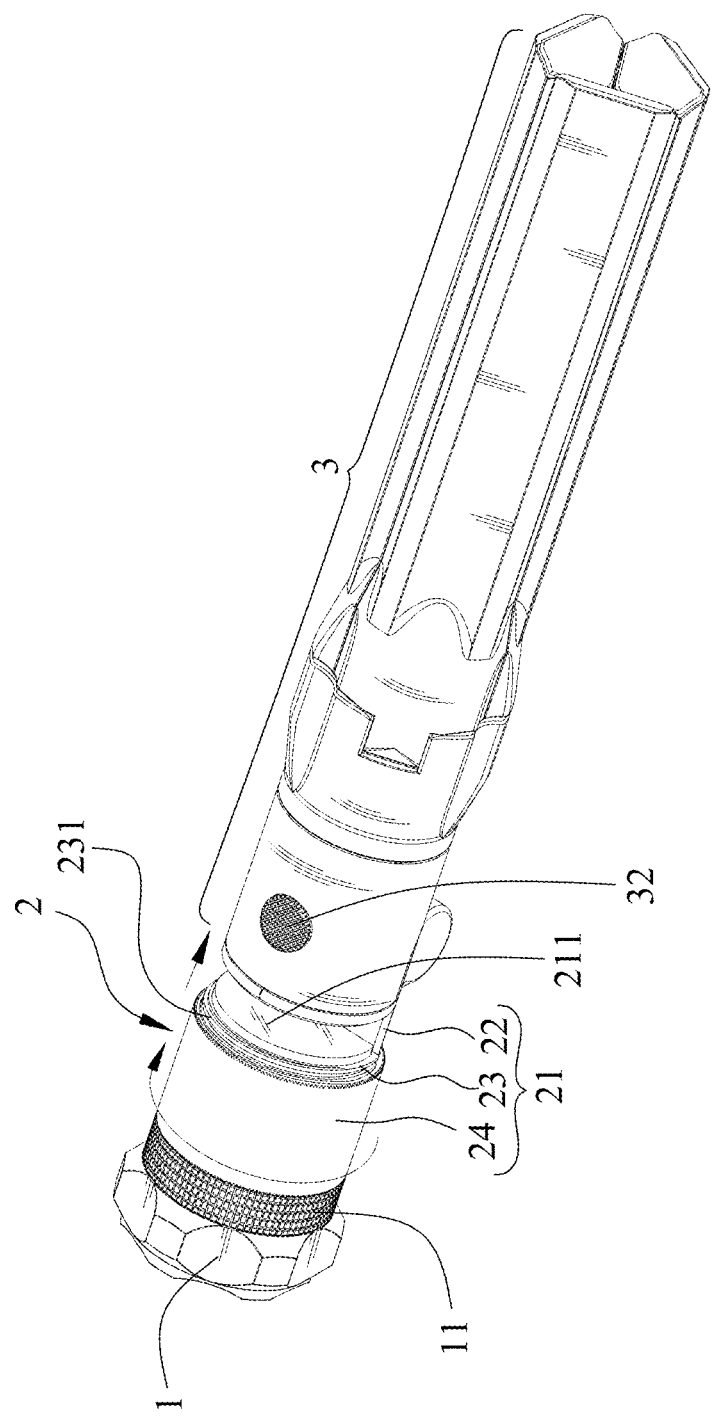
FIG. 2 shows another schematic view of the present invention.

FIG. 1 and FIG. 2 show schematic views of the present invention viewed from different perspective angle. The present invention has a tubular shape and includes, from left to right in the figures, a lighting device 1, a carrier unit 2 and a support unit 3. The carrier unit 2 has two ends, with one end disposed with the lighting device 1 and the other end engaged to the support unit 3. The lighting device 1 projects the light in a direction with an optical axis parallel or perpendicular to the central line of the carrier unit 2. In the present embodiment, the engagement between the support unit 3 and the carrier unit 2 is through a coupling structure 31. As such, the projection direction of the lighting device 1 can be adjusted.

The lighting device 1 is a light-emitting diode (LED) lighting device, disposed at one end of the carrier unit 2. The light is projected from the end outwards. A control circuit is included inside the lighting device 1 for adjusting the brightness or light color of the light. The joint of the lighting device 1 and the carrier unit 2 further includes a warning light ring 11. The light projected from the warning light ring 11 is preferably red for warning purpose and the projection is in radiation manner.

Figure 3:
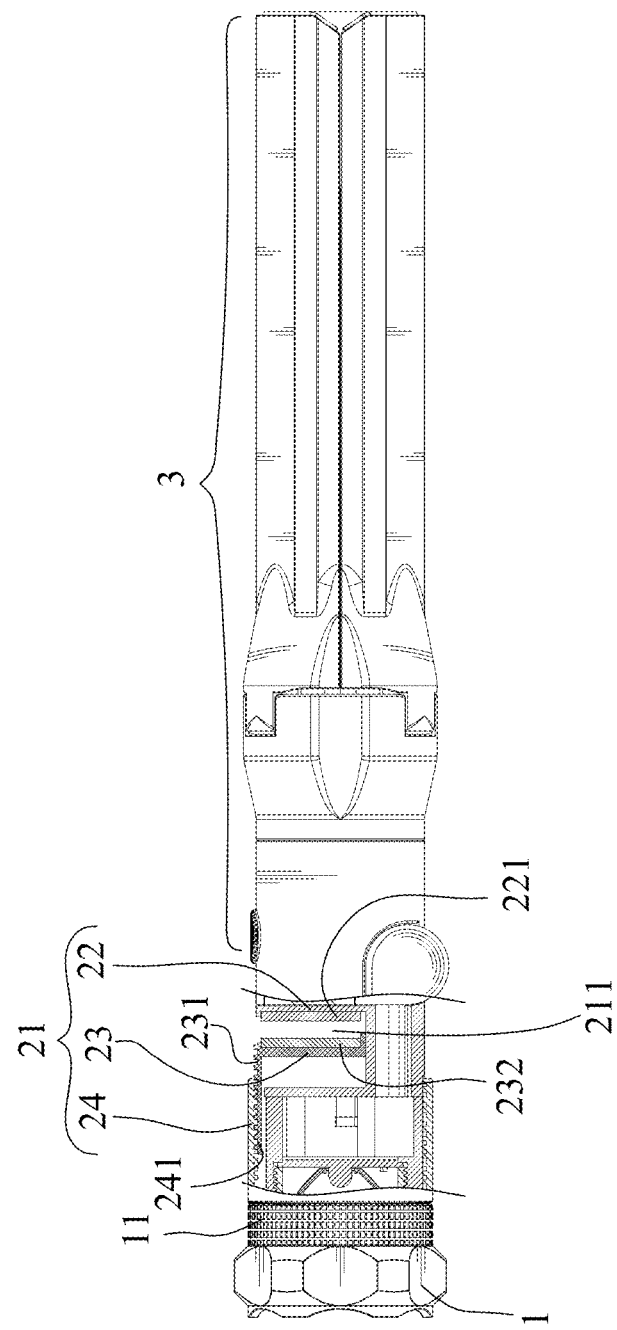
FIG. 3 shows a partial cross-sectional view of the present invention.

The carrier unit 2 has a tubular-like shape, with a body including a clamping assembly 21. The clamping assembly 21 has a clamping opening 211, whose direction is perpendicular to the axis of the light projection of the lighting device 1. The clamping assembly 21 includes a clamping base 22, a clamping element 23 and a rotation element 24. The clamping base 22 provides for the disposition of the clamping element 23, and only allows moving in a linear manner so that the clamping element 23 can move towards or away from the clamping opening 211. As shown in FIG. 3, the clamping element 23 has an arc-shape outer wall surface with screw teeth 231. The rotation element 24 has a tubular shape with inner screw teeth 241. The rotation element 24 is engaged to the clamping element 23 with screw teeth 241 and screw teeth 231. When the rotation element 24 rotates, the clamping element 23 moves so that the clamping opening is open or close. The surface of the clamping element 23 facing the clamping opening 211 includes anti-slip pads 232, 221, made of material with high friction index. As such, when clamping, the surface of the smart phone is protected.

The support unit 3 has a tubular shape, including an exposed switch 32 and a battery set inside the support unit 3. The battery unit includes a plurality of batteries connected in series or parallel, and is connected to the switch 32 and the lighting device 1 through an internal circuit. The switch 32 controls the ON and OFF of the lighting device 1.

Figure 4:
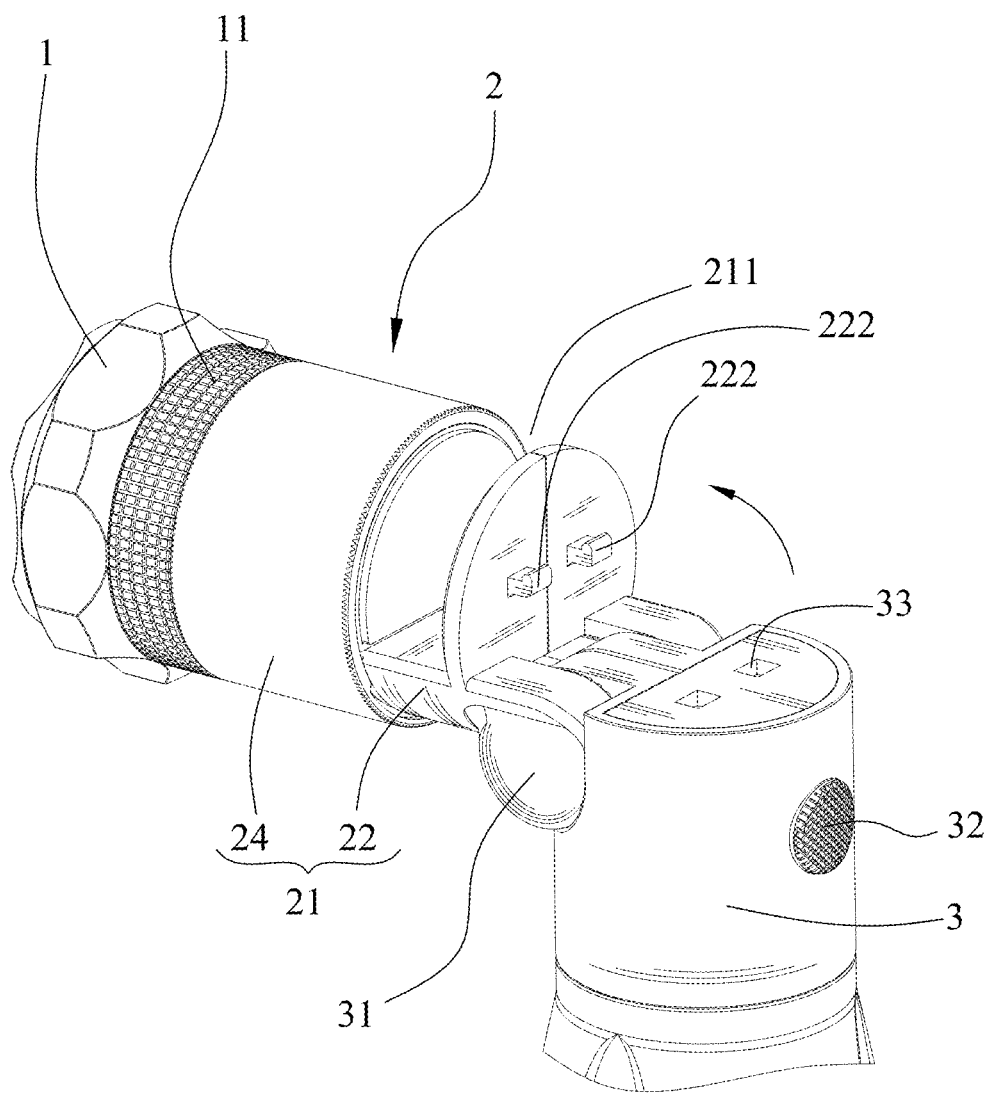
FIG. 4 shows a partially enlarged view of adjusting the carrier unit and the support unit of the present invention to become perpendicular to each other.

Several means can be used for the engagement of the support unit 3 and the carrier unit 2. For example, the support unit 3 can be connected directly to the carrier unit 2 and is not adjustable. However, the present embodiment uses a different approach, as shown in FIG. 4. The support unit 3 is connected to the carrier unit 2 through a coupling structure 31. As such, the support unit 3 can stand alone on a flat surface and then the projection direction of the lighting device 1 can be adjusted. In the present embodiment, the coupling structure 31 provides a maximum of 90° for adjustment. The surface of the clamping base 22 of the carrier unit 2 facing the support unit 2 is disposed with at least a protruding resilient buckle element 222. Accordingly, the inner wall of the support unit 3 facing the location is disposed with at least an engaging trench 33. After the carrier unit 2 is adjusted to the same axis level with the support unit 3, the resilient buckle element 222 is engaged to inside of the engaging trench 33 to fasten temporarily the position of the two.

Figure 5:
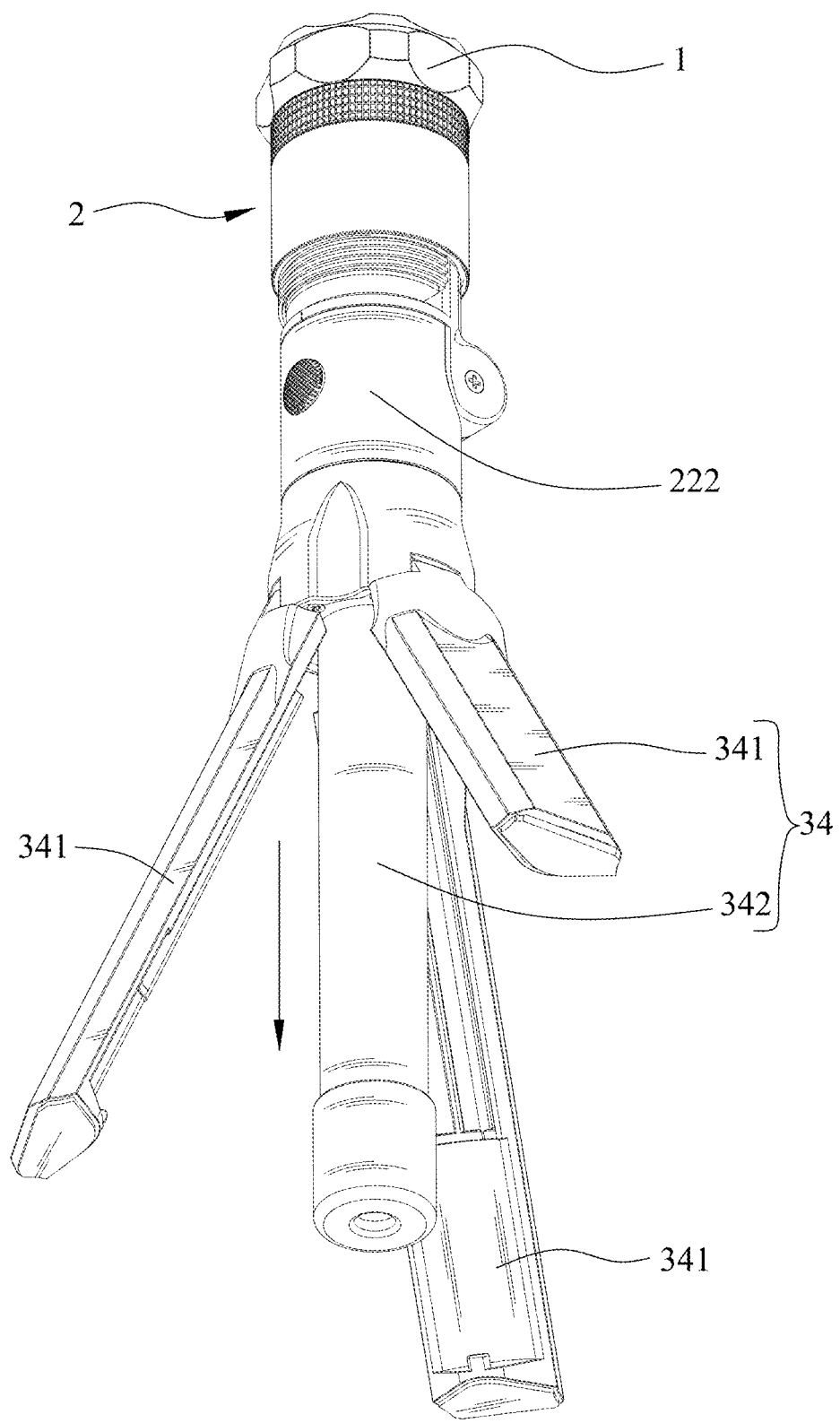
FIG. 5 shows a schematic view of the tripod structure of the support unit of the present invention.

Moreover, as shown in FIG. 5, the support unit 3 can further includes a tripod set 34, disposed at the end of the support unit 3 away from the carrier unit 2. The tripod set 34 can be of a known structure, such as, a plurality of legs 341 with a retractable rod at the center 342. When the legs 341 are folded towards the retractable rod 342, the tripod set 34 becomes a handle for convenient holding. When expanded, the legs 341 can stand on the ground. In another embodiment, the battery set can be serially connected and hidden inside the retractable rod 342.

Figure 6:
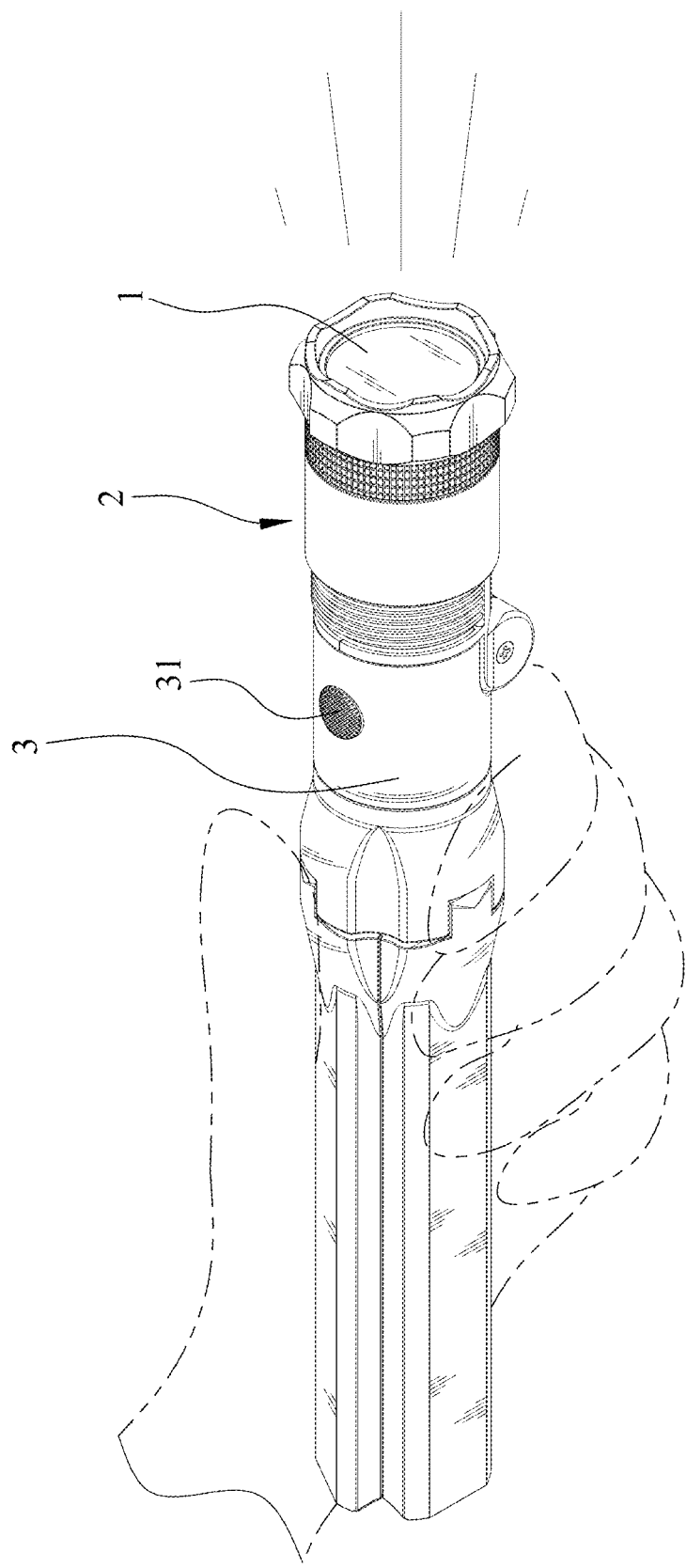
FIG. 6 shows a schematic view of the present invention as a flashlight.
Figure 7A:
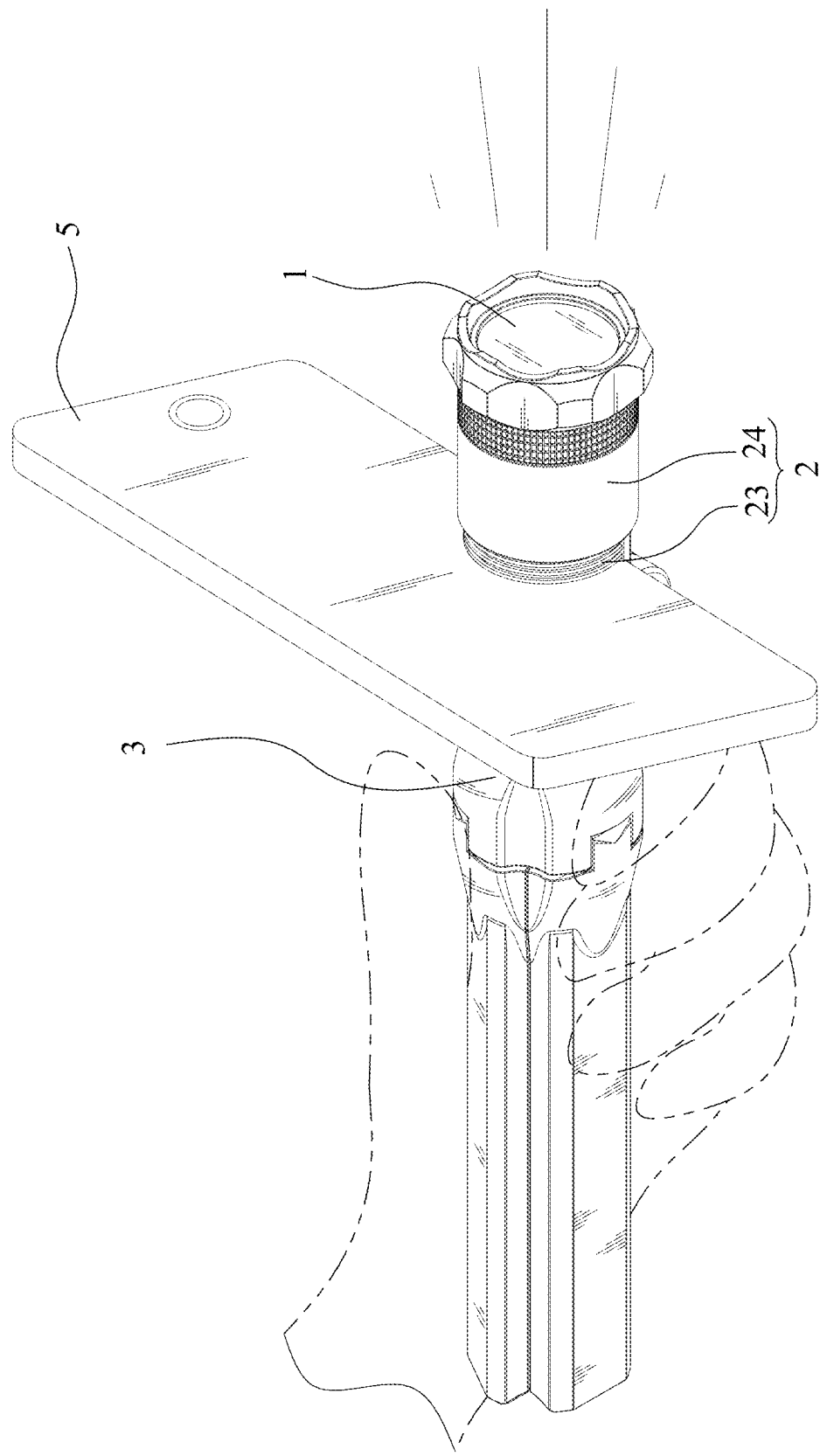
FIG. 7A shows a schematic view of using the present invention to hold a smart phone.
Figure 7B:
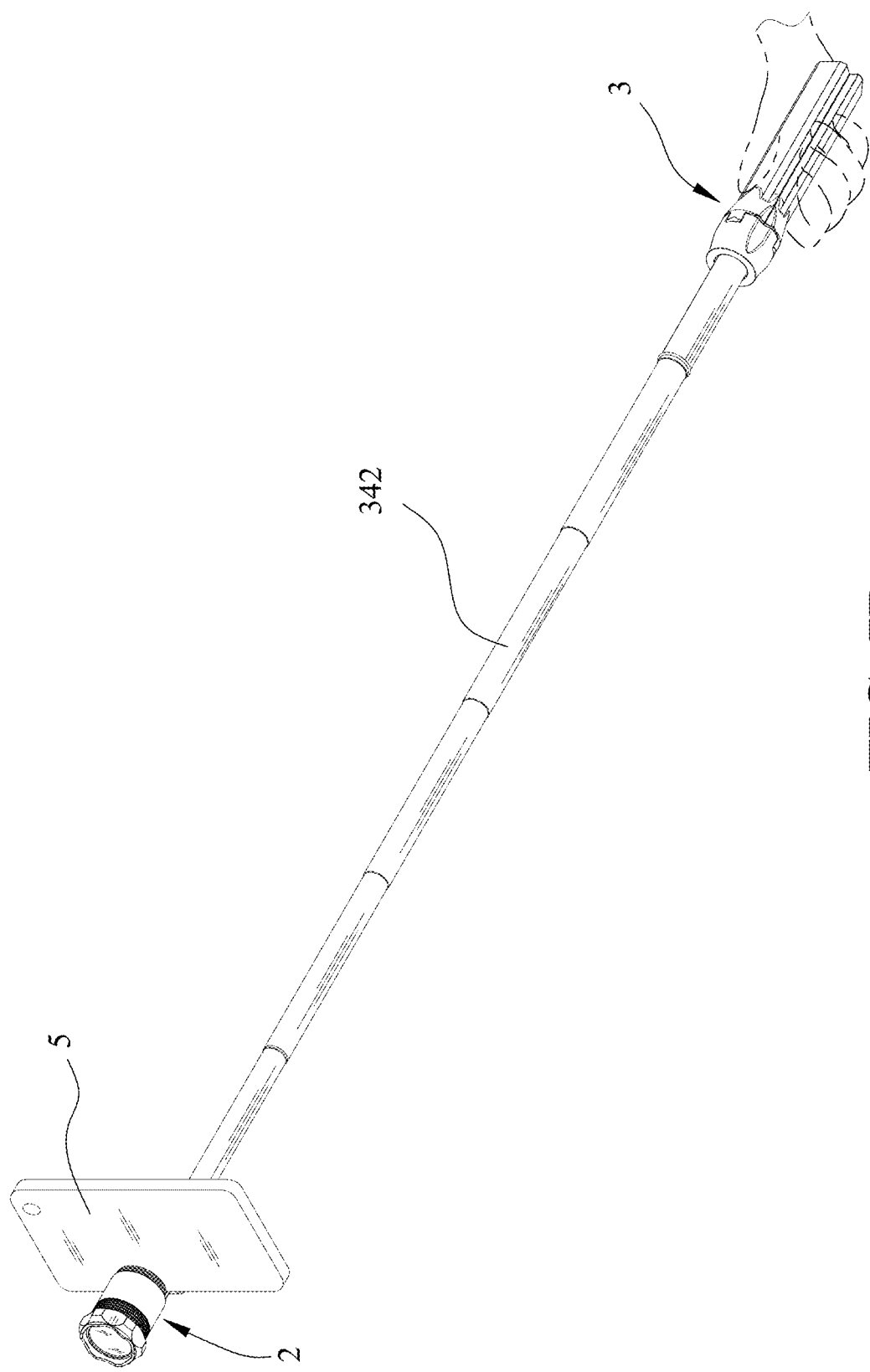
FIG. 7B shows a schematic view of the present invention holding a smart phone to form a selfie-stick.

In actual application, as shown in FIG. 6, the apparatus of the present invention can be used as a flashlight. As shown in FIG. 7A and FIG. 7B, a smart phone 5 is fastened to the clamping opening 211 of the carrier unit 2. The rotation element 24 is rotated to clamp onto the smart phone so that the smart phone stands in a portrait orientation at the carrier unit 2. As such, the support unit 3 can be held by hand to take pictures in an environment with insufficient ambient light with the use of the lighting device 1 as the auxiliary lighting source. Also as shown in FIG. 7B, when the retractable rod 342 is expanded, the support unit 3 can be held by hand as a selfie-stick for photography.

Figure 8:
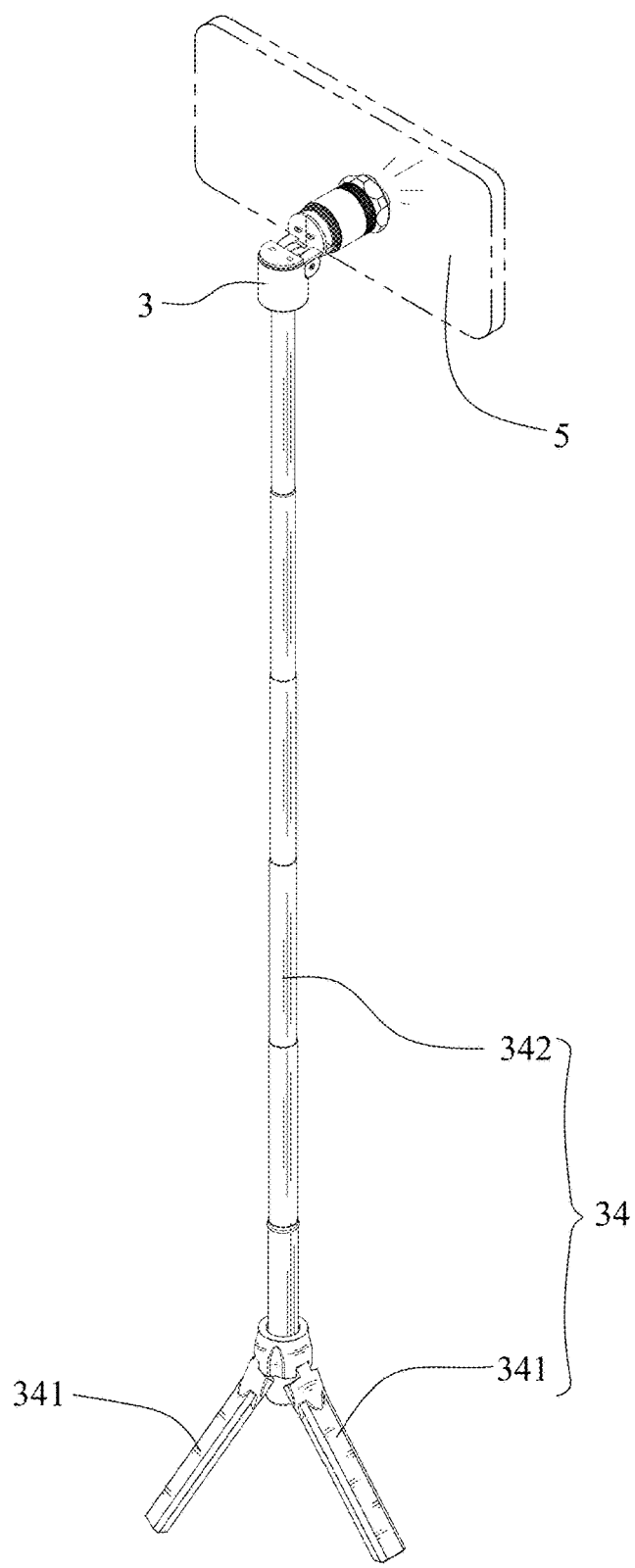
FIG. 8 shows a schematic view of the present invention standing on a ground and used with a smart phone.

As shown in FIG. 8, the carrier unit 2 is adjusted to a horizontal position through the coupling structure 31. At this point, the support unit 3 is placed on a flat surface or the legs 341 are expanded to stand on the ground. Similarly, when the ambient light is insufficient, the lighting device 1 can provide auxiliary lighting.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A multi-function portable lighting apparatus, comprising:
   a lighting device;
   a carrier unit, having two ends, with one end disposed with the lighting device, the carrier unit having a body disposed with a clamping assembly, the clamping assembly having a clamping opening whose direction perpendicular to a light projection axis of the lighting device, the clamping assembly further comprising a clamping base, a clamping element disposed at the clamping base and a rotation element, the clamping element having an arc-shape outer wall surface with screw teeth, the rotation element having a tubular shape with inner screw teeth and being engaged to the clamping element with matching screw teeth, when the rotation element rotates, the clamping element moving in the clamping base in a linear manner so as to make the clamping opening open or close; and
   a support unit, coupled to the other end of the carrier unit, the support unit having a battery set providing power to the light device through an internal circuit.

2. The multi-function portable lighting apparatus as claimed in claim 1, wherein the surface of the clamping element facing the clamping opening comprises an anti-slip pad and the corresponding surface of the clamping base is also disposed with an anti-slip pad.

3. The multi-function portable lighting apparatus as claimed in claim 1, wherein the carrier unit is engaged to the support unit through a coupling structure to allow angle adjustment to change the light projection direction of the lighting device.

4. The multi-function portable lighting apparatus as claimed in claim 3, wherein the surface of the clamping base of the carrier unit facing the support unit is disposed with at least a protruding resilient buckle element, and correspondingly the inner wall of the support unit facing the support unit is disposed with at least an engaging trench; when the carrier unit is adjusted to a same axis level with the support unit, the resilient buckle element is engaged to inside of the engaging trench to fasten temporarily the position of the resilient buckle element and the engaging trench.

5. The multi-function portable lighting apparatus as claimed in claim 3, wherein the support unit further comprises a tripod set, disposed at the end of the support unit away from the carrier unit.

* * * * *